United States Patent
Wodausch et al.

(10) Patent No.: US 10,913,348 B2
(45) Date of Patent: Feb. 9, 2021

(54) METHOD FOR OPERATING AN INTERNAL COMBUSTION ENGINE, INTERNAL COMBUSTION ENGINE, AND MOTOR VEHICLE

(71) Applicant: Volkswagen Aktiengesellschaft, Wolfsburg (DE)

(72) Inventors: Jens Wodausch, Braunschweig (DE); Björn Fröhlich, Gifhorn (DE); Silke Weddig, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/288,363

(22) Filed: Feb. 28, 2019

(65) Prior Publication Data
US 2019/0263258 A1    Aug. 29, 2019

(30) Foreign Application Priority Data
Feb. 28, 2018 (DE) .................. 10 2018 104 622

(51) Int. Cl.
*B60K 15/03* (2006.01)
*F02D 41/00* (2006.01)
(Continued)

(52) U.S. Cl.
CPC .. *B60K 15/03504* (2013.01); *B60K 15/03519* (2013.01); *F02D 41/0032* (2013.01);
(Continued)

(58) Field of Classification Search
CPC ............ F02D 41/0032; F02D 41/0045; F02D 41/1438; F02D 41/0042; F02D 41/004;
(Continued)

(56) References Cited

U.S. PATENT DOCUMENTS 7,823,569 B2 *  11/2010  Mai ................. F02D 41/0042
                                                123/520
2004/0231319 A1 * 11/2004  Weirich ........... F02D 41/0032
                                                 60/274
(Continued)

FOREIGN PATENT DOCUMENTS

CN          101258320 A       9/2008
CN          202091061 U      12/2011
(Continued)

OTHER PUBLICATIONS

Search report for German Patent Application No. 10 2018 104 622.7, dated Nov. 6, 2018.
(Continued)

*Primary Examiner* — Syed O Hasan
(74) *Attorney, Agent, or Firm* — Pearl Cohen Zedek Latzer Baratz LLP (57) ABSTRACT

A method for venting a fuel tank system of an internal combustion engine is provided, wherein the fuel tank system includes at least a fuel tank, a fuel vapor filter that is fluidically connected to an opening to the environment, a vent line that leads from the fuel tank to the fuel vapor filter, a purge gas line that leads from the fuel vapor filter to a fresh gas tract of the internal combustion engine, a purge gas conveying device that is integrated into the purge gas line, and an exhaust tract with a lambda sensor integrated therein. Control of the purge gas conveying device is carried out based on the measuring signal of the lambda sensor in order to regulate a volume flow of the purge gas in the purge gas line. The method may advantageously be carried out in an internal combustion engine that additionally includes a lambda controller. Since such an internal combustion engine should include a lambda sensor anyway for operating such a lambda controller, the method allows regulation of the venting of the fuel tank system of the internal combustion (Continued)

engine without an additional sensor system, which is advantageous for the manufacturing costs for such an internal combustion engine.

11 Claims, 7 Drawing Sheets

(51) Int. Cl.
    *B60K 15/035*     (2006.01)
    *F02M 25/08*     (2006.01)
    *F02D 41/14*     (2006.01)

(52) U.S. Cl.
    CPC ..... *F02D 41/0045* (2013.01); *F02D 41/1438* (2013.01); *F02M 25/0836* (2013.01); *F02M 25/089* (2013.01)

(58) Field of Classification Search
    CPC .............. F02D 41/1454; F02D 41/221; F02M 25/0836; F02M 25/089
    See application file for complete search history.

(56) References Cited

U.S. PATENT DOCUMENTS

| | | | |
|---|---|---|---|
| 2009/0211560 A1 | 8/2009 | Lederle et al. | |
| 2011/0226804 A1 | 9/2011 | Bierl et al. | |
| 2013/0213366 A1* | 8/2013 | Weigl | F02D 29/02 123/520 |
| 2014/0299111 A1 | 10/2014 | Denz | |
| 2016/0123254 A1 | 5/2016 | Burleigh et al. | |
| 2016/0185208 A1* | 6/2016 | Hagen | B60K 15/03519 251/129.01 |
| 2017/0260931 A1* | 9/2017 | Guidi | F02M 26/20 |
| 2018/0216578 A1 | 8/2018 | Wodausch | |

FOREIGN PATENT DOCUMENTS

| | | |
|---|---|---|
| CN | 107178441 A | 9/2017 |
| CN | 107636294 A | 1/2018 |
| DE | 44 01 887 A1 | 8/1994 |
| DE | 10 2011 086 946 A1 | 2/2013 |
| DE | 10 2015 117 050 A1 | 5/2016 |
| DE | 10 2015 216 504 A1 | 3/2017 |
| EP | 2 627 889 A1 | 8/2013 |
| EP | 3 354 508 A1 | 8/2018 |
| WO | WO 2012/049230 A1 | 4/2012 |

OTHER PUBLICATIONS

Search report for European Patent Application No. 19157135.5, dated Jul. 24, 2019.

Office Action and Search report for Chinese Patent Application No. 201910149973.4, dated Sep. 30, 2020.

\* cited by examiner

METHOD FOR OPERATING AN INTERNAL COMBUSTION ENGINE, INTERNAL COMBUSTION ENGINE, AND MOTOR VEHICLE

CROSS-REFERENCE TO RELATED APPLICATIONS

This application claims priority from German Patent Application No. 10 2018 104 622.7, filed Feb. 28, 2018, which is hereby incorporated by reference.

FIELD OF THE INVENTION

The invention relates to a method for operating an internal combustion engine having a fuel tank system that includes a tank vent valve. The invention further relates to an internal combustion engine that is suitable for carrying out such a method, and a motor vehicle having such an internal combustion engine.

BACKGROUND OF THE INVENTION

A fuel tank system for an internal combustion engine of a motor vehicle generally has a vent line that allows relief of increasing pressure in the fuel tank of the tank system due to, for example, fuel evaporating to the environment at high ambient temperatures. Under emission regulations, preferably no fuel vapors are allowed to escape to the environment. This is achieved by integrating a fuel vapor filter, which is generally designed in the form of an activated carbon filter, into the vent line to absorb the fuel vapors.

For regeneration of such a fuel vapor filter, such a tank system is additionally provided with a purge gas line that is connected on the one hand to the fuel vapor filter and on the other hand to the fresh gas tract of the internal combustion engine. During operation of the internal combustion engine, as the result of negative pressure that prevails in comparison to ambient pressure in the area of the opening of the purge gas line into the fresh gas tract, ambient air may be temporarily drawn in through an opening in the fuel vapor filter to the environment; the ambient air flows through the fuel vapor filter in the direction opposite to the flow direction in which the fuel vapors flow from the fuel tank into the fuel vapor filter, and thus purges the fuel vapor filter. The fuel vapors from the fuel vapor filter are thus supplied to the combustion chambers of the combustion engine of the internal combustion engine via the fresh gas tract.

DE 44 01 887 A1 discloses control of a purge gas stream in a purge gas line of a fuel tank system by means of a control valve, based on the measuring signal of a lambda sensor that is integrated into the exhaust tract of an associated internal combustion engine.

DE 10 2011 086 946 A1 describes an internal combustion engine that is charged by means of a compressor, having a fuel tank system that may be vented via two purge gas lines, wherein a first purge gas line with an integrated vent valve opens into a section of the fresh gas tract downstream from the compressor, and a second purge gas line that includes a purge gas conveying device opens into a section of the fresh gas tract upstream from the compressor. Loading of a fuel vapor filter of the tank system is determined based on the measuring signal of a lambda sensor.

SUMMARY OF THE INVENTION

The object of the invention is to provide an advantageous method for venting a fuel tank system of an internal combustion engine.

This object is achieved by means of a method according to the invention, and an internal combustion engine that is suitable for carrying out such a method. Advantageous embodiments of the method according to the invention and preferred embodiments of the internal combustion engine according to the invention are the subject matter of the further patent claims and/or result from the following description of the invention.

According to the invention, a method for venting a fuel tank system of an internal combustion engine is provided, the fuel tank system including at least
 a fuel tank,
 a fuel vapor filter that is fluidically connected to an opening to the environment,
 a vent line that leads from the fuel tank to the fuel vapor filter,
 a purge gas line that leads from the fuel vapor filter to a fresh gas tract of the internal combustion engine, and
 a purge gas conveying device, i.e., a so-called purge gas pump, that is integrated into the purge gas line.

The internal combustion engine also has an exhaust tract with a lambda sensor integrated therein. According to the invention, control of the purge gas conveying device is carried out based on the measuring signal of the lambda sensor in order to regulate a volume flow of the purge gas in the purge gas line.

According to the invention, the term "fuel vapor filter" does not mean that the filter has to filter the volatile fuel in gaseous form. Rather, the fuel may also already be (partially) recondensed during the filtering.

An internal combustion engine according to the invention includes on the one hand at least
 a preferably spark ignition combustion engine (gasoline engine, for example),
 a fresh gas tract for supplying fresh gas to the combustion engine,
 an exhaust tract, including a lambda sensor, for discharging exhaust gas from the combustion engine, and
[on the other hand]
 a fuel tank system that includes at least
  a fuel tank,
  a fuel vapor filter that is fluidically connected to an opening to the environment,
  a vent line that leads from the fuel tank to the fuel vapor filter,
  a purge gas line that leads from the fuel vapor filter to the fresh gas tract of the internal combustion engine,
  a purge gas conveying device that is integrated into the purge gas line.

In addition, an internal combustion engine according to the invention includes a control device that is designed for carrying out a method according to the invention in an automated manner.

The method according to the invention may be carried out particularly advantageously in an internal combustion engine which, as is also preferably provided for an internal combustion engine according to the invention, additionally includes a lambda controller which is a device or a software application that, based on the measuring signal of the lambda sensor, controls the quantities of the fuel introduced into the combustion chamber(s) of the combustion engine in such a way that, taking into account the oxygen that is likewise introduced into the combustion chambers via the fresh gas, a defined fuel-oxygen ratio is set, which for a spark ignition combustion engine is generally approximately stoichiometric. Since such an internal combustion engine should include a lambda sensor anyway for operating such a lambda controller, the method according to the invention allows regulation of the venting of the fuel tank system of the internal combustion engine without an additional sensor system, which is advantageous for the manufacturing costs for such an internal combustion engine.

According to one preferred embodiment of an internal combustion engine according to the invention, it may be provided that the internal combustion engine also includes a control valve (so-called tank vent valve) that is integrated into the purge gas line. A method for venting the fuel tank system of such an internal combustion engine may then preferably include carrying out a control of the control valve based on the measuring signal of the lambda sensor in order to regulate the volume flow of the purge gas in the purge gas line or the volume flow of the purge gas introduced into the fresh gas tract. When the purge gas conveying device as well as the control valve are controlled based on the measuring signal of the lambda sensor in order to regulate a defined volume flow of the purge gas in the purge gas line or passage of purge gas from the purge gas line into the fresh gas tract of the internal combustion engine, the quantity of purge gas to be introduced into the fresh gas may be metered in a particularly precise manner, which has a positive effect on attaining a defined fuel-oxygen ratio of the fuel-air mixture quantities that are introduced into the combustion chamber(s) of the combustion engine, and which may result in advantageous operation of the combustion engine with in particular the highest possible efficiency and the lowest possible pollutant emissions.

According to one preferred embodiment of a method according to the invention, it may be provided that for controlling the purge gas conveying device and/or the control valve, the absolute value of the measuring signal of the lambda sensor and/or a correction value for the lambda controller of the internal combustion engine that is derived from this absolute value are/is utilized.

If both the purge gas conveying device and the preferably provided control valve are controlled based on the measuring signal of the lambda sensor in order to regulate a volume flow of the purge gas in the purge gas line or the passage of this purge gas stream from the purge gas line into the fresh gas tract of the internal combustion engine, it may be provided that controls of the purge gas conveying device and of the control valve may be carried out decoupled from one another. Alternatively, however, control for at least one, preferably for each, of these components may be carried out, taking the control value of the other component into account, which may result in particularly advantageous control. For control of the components independently of one another, it may be provided in particular that the purge gas conveying device is operated in multiple drive speed stages, and the control valve is controlled in a control range (0% to 100%, for example), wherein a change is made from a relatively low drive speed stage to a relatively high drive speed stage when, during operation of the purge gas conveying device in the relatively low drive speed stage, a greater purge gas requirement is determined or a greater volume flow of the purge gas in the purge gas line is to be set, despite maximum control of the control valve.

According to one preferred embodiment of an internal combustion engine according to the invention, the internal combustion engine may include a pressure and/or temperature sensor that is integrated into the purge gas line. Such a pressure and/or temperature sensor may be used in particular for diagnostic purposes and/or for determining the concentration of hydrocarbons (HC) in the purge gas. By additionally taking into account the HC concentration, it is possible to determine even more accurately the quantities of hydrocarbons that are introduced via the purge gas into the fresh gas tract, and via the fresh gas tract into the combustion chambers of the combustion engine, which in turn may be compensated for by an appropriate control of the combustion engine, in particular with regard to fuel that is introduced via injectors, to achieve the most advantageous operation of the combustion engine possible.

Furthermore, an internal combustion engine according to the invention may advantageously include a shutoff valve that is integrated into the purge gas line, by means of which, in addition to the control valve, the flow through the purge gas line may optionally be influenced and in particular interrupted as necessary. By use of such a shutoff valve, preferably rapid blocking of the purge gas line, and thus, blocking of the fuel tank system from the fresh gas tract of the internal combustion engine, may be achieved, in particular independently of the control valve.

An internal combustion engine according to the invention may in particular be part of a motor vehicle. The combustion engine of the internal combustion engine may be provided in particular for directly or indirectly providing the drive power for the motor vehicle. Therefore, the invention further relates to a motor vehicle, in particular a wheel-based, not a rail-bound, motor vehicle (preferably a passenger vehicle or truck) having an internal combustion engine according to the invention.

The indefinite articles "a" and "an," in particular in the claims and in the description which provides a general explanation of the claims, are understood as such, and not as numerals. Accordingly, specific components are to be understood in such a way that they may be present at least once, and may be present multiple times.

BRIEF DESCRIPTION OF THE DRAWINGS

The present invention is explained in greater detail below based on one exemplary embodiment that is illustrated in the drawings, which show the following.

DETAILED DESCRIPTION OF THE INVENTION

Figure 1:
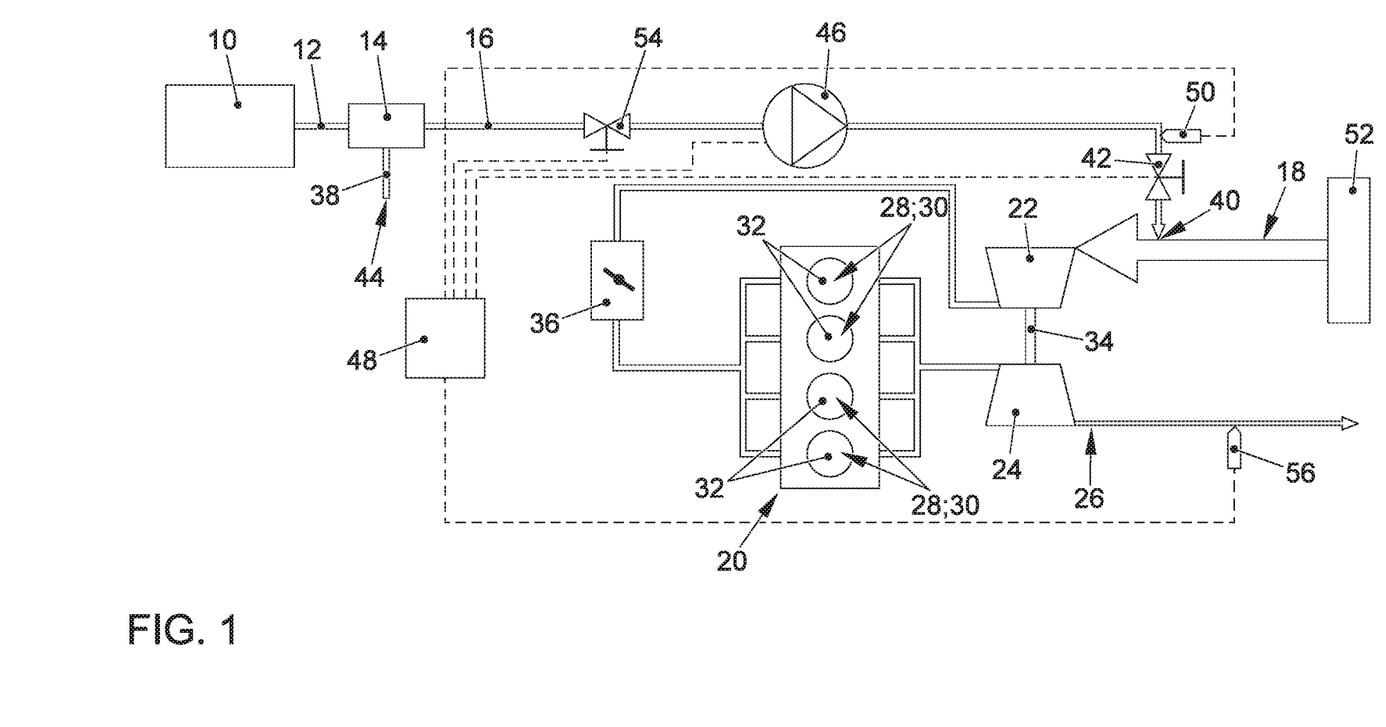
FIG. 1: shows a schematic illustration of an internal combustion engine according to the invention according to a first embodiment.

FIG. 1 shows an internal combustion engine according to the invention for a motor vehicle having a fuel tank system. The fuel tank system includes a fuel tank 10 that is connected via a vent line 12 to a fuel vapor filter 14, which may in particular be designed in the form of an activated carbon filter or may at least include such an activated carbon filter. The fuel vapor filter 14 is also connected to a fresh gas tract 18 of the internal combustion engine via a purge gas line 16, the purge gas line 16 opening into the fresh gas tract 18 upstream (with respect to the flow direction of fresh gas in the fresh gas tract 18 in the direction of a combustion engine 20 of the internal combustion engine) from a charge air compressor 22 that is integrated into the fresh gas tract 18. The charge air compressor 22 is part of an exhaust gas turbocharger, which also includes an exhaust gas turbine 24 that is integrated into an exhaust tract 26 of the internal combustion engine. Also provided in the charge air section of the fresh gas tract 18, situated between the charge air compressor 22 and the combustion engine 20, is a throttle valve 36 that divides the charge air section into an upstream section, often referred to as the pressure tube, and a downstream section, often referred to as the intake manifold.

During operation of the internal combustion engine, mixture quantities composed of fresh gas, consisting completely or primarily of ambient air and drawn in from the outside via an air filter 52, and fuel that is injected, for example directly, into the combustion chambers 2 by means of injectors 8 (not illustrated), are combusted in a known manner, in a defined sequence, in combustion chambers 28 of the combustion engine 20 which are partially delimited by cylinders 30 of the combustion engine 20, wherein the increased pressure generated in this way in the combustion chambers 28 is utilized to move pistons 32 which are movably guided in the cylinders 30 in the longitudinally axial direction. These movements of the pistons 32 are converted to a rotary motion of a crankshaft (not illustrated), with connecting rods (not illustrated) connected in between, wherein the guiding of the pistons 32 via the connecting rods by means of the crankshaft at the same time results in a cyclical back-and-forth movement of the pistons 32. The exhaust gas formed during combustion of the fresh gas-fuel mixture quantities in the combustion chambers 28 is discharged via the exhaust tract 26 and flows through the exhaust gas turbine 24, resulting in a rotary drive of a turbine impeller (not illustrated). This rotation of the turbine impeller is transmitted to a compressor impeller (not illustrated) of the charge air compressor 22 by means of a shaft 34, as the result of which the charge air compressor 22 provides for compression of the fresh gas that is to be supplied to the combustion engine 20 via the fresh gas tract 18.

The fuel vapor filter 14 of the fuel tank system, with its side facing away from the vent line 12 and the purge gas line 16 (based on its filtering action for fuel vapors), is in gas-conducting connection with the environment via an ambient air line 38, for which purpose the ambient air line 38 forms an opening 44 to the environment.

The fuel tank 10 is partially filled with fuel, wherein a portion of this fuel that is actually liquid is generally evaporated, so that fuel is also present in the gaseous physical state in the fuel tank 10. Such evaporation of fuel in the fuel tank 10 is increased by a relatively high temperature of the fuel, which may be the case in particular at relatively high ambient temperatures and when there is a change in the ambient pressure, for example due to uphill travel of a motor vehicle that includes the internal combustion engine. To avoid impermissibly high positive pressure in the fuel tank 10 due to such evaporation, there is an option for pressure compensation with the ambient pressure via the vent line 12 and the fuel vapor filter 14 as well as via the ambient air line 38, wherein the fuel vapor filter 14 prevents such pressure compensation from resulting in escape of fuel vapors to the environment.

Such venting of the fuel tank 10 results in increasing saturation of the fuel vapor filter 14, which in turn requires regeneration of the fuel vapor filter at regular intervals. Purging of the fuel vapor filter 14 is provided for this purpose, in which ambient air is drawn in via the opening 44 to the environment and the ambient air line 38. This ambient air flows through the fuel vapor filter 14 in the opposite direction relative to the flow during venting of the fuel tank 10, as the result of which fuel molecules that are absorbed in the fuel vapor filter 14 are entrained by the ambient air and discharged into the fresh gas tract 18 via the purge gas line 16. This fuel, which generally contains a mixture of different hydrocarbons, is thus supplied for combustion in the combustion chambers 28 of the combustion engine 20.

Such purging of the fuel vapor filter 14 is only temporary, and is always provided during operation of the combustion engine 20, since only then can the fuel, which is introduced into the fresh gas tract 18 by purging the fuel vapor filter 14, also be reliably supplied for combustion in the combustion chambers 28. In contrast, introduction into the fresh gas tract 18 when the combustion engine 20 is not operating could result in the gaseous fuel escaping to the environment via leaks in the fresh gas tract 18 and in particular via an intake opening of the fresh gas tract 18.

A control valve or tank vent valve 42 is integrated into the purge gas line 16, and is situated as close as possible to the opening 40 of the purge gas line 16 into the fresh gas tract 18, or is integrated into same.

For purging the fuel vapor filter 14, it is necessary to have a sufficient pressure drop between the ambient pressure on the one hand and the pressure in the fresh gas tract 18 in the area of the opening 40 of the purge gas line 16 on the other hand; this pressure drop is not always provided due to greatly fluctuating pressures in the fresh gas tract 18 during operation of the combustion engine 20. During operation of the combustion engine 20, and thus of the charge air compressor 22, the pressure of the fresh gas in the section of the fresh gas tract 18 in the area of the opening 40 of the purge gas line 16 is usually so low that there is a sufficient pressure drop in relation to the ambient pressure present at the opening 44 to the environment. However, this is not always the case.

To allow purging of the fuel vapor filter 14 at any time so that complete saturation of the fuel vapor filter may be prevented, the fuel tank system of the internal combustion engine also includes a purge gas conveying device 46, generally also referred to as a "purge air pump," that is integrated into the purge gas line 16 and that may be designed in the form of a piston compressor, in particular as a vane compressor, or as a radial blower. By operation of this purge gas conveying device 46, ambient air may be actively drawn in via the opening 44 to the environment, and then flows through the fuel vapor filter 14 to purge it, and via the purge gas conveying device 46 and the at least partially open tank vent valve 42 may be conveyed to the opening 40 of the purge gas line 16. In addition, a shutoff valve 54 having two switching positions is integrated into the purge gas line 16 in a section between the fuel vapor filter 14 and the purge gas conveying device 46. In a first switching position, flow through the purge gas line 16 is completely prevented by the shutoff valve 54, while in the second switching position the shutoff valve allows such flow to the greatest extent possible.

At least the purge gas conveying device 46, the tank vent valve 42, the shutoff valve 54, the throttle valve 36, and the injectors are controllable by means of a control device 48 (for example, the engine control unit of the internal combustion engine). At the same time, the control device 48 receives measuring signals of a pressure sensor 50 that is integrated into the purge gas line 16 in a section between the purge gas conveying device 46 and the tank vent valve 42, and receives measuring signals of a lambda sensor 56 that is integrated into the exhaust tract 26, downstream from the exhaust gas turbine 24. The control device 48 is also used as a lambda controller of the internal combustion engine, for which purpose the control device determines the quantities of fuel to be injected into the combustion chambers 28, in such a way that during operation a defined, possibly variable fuel-oxygen ratio of the fuel-fresh gas mixture quantities that are combusted in the combustion chambers 28 is maintained in the most precise manner possible.

Figure 2:
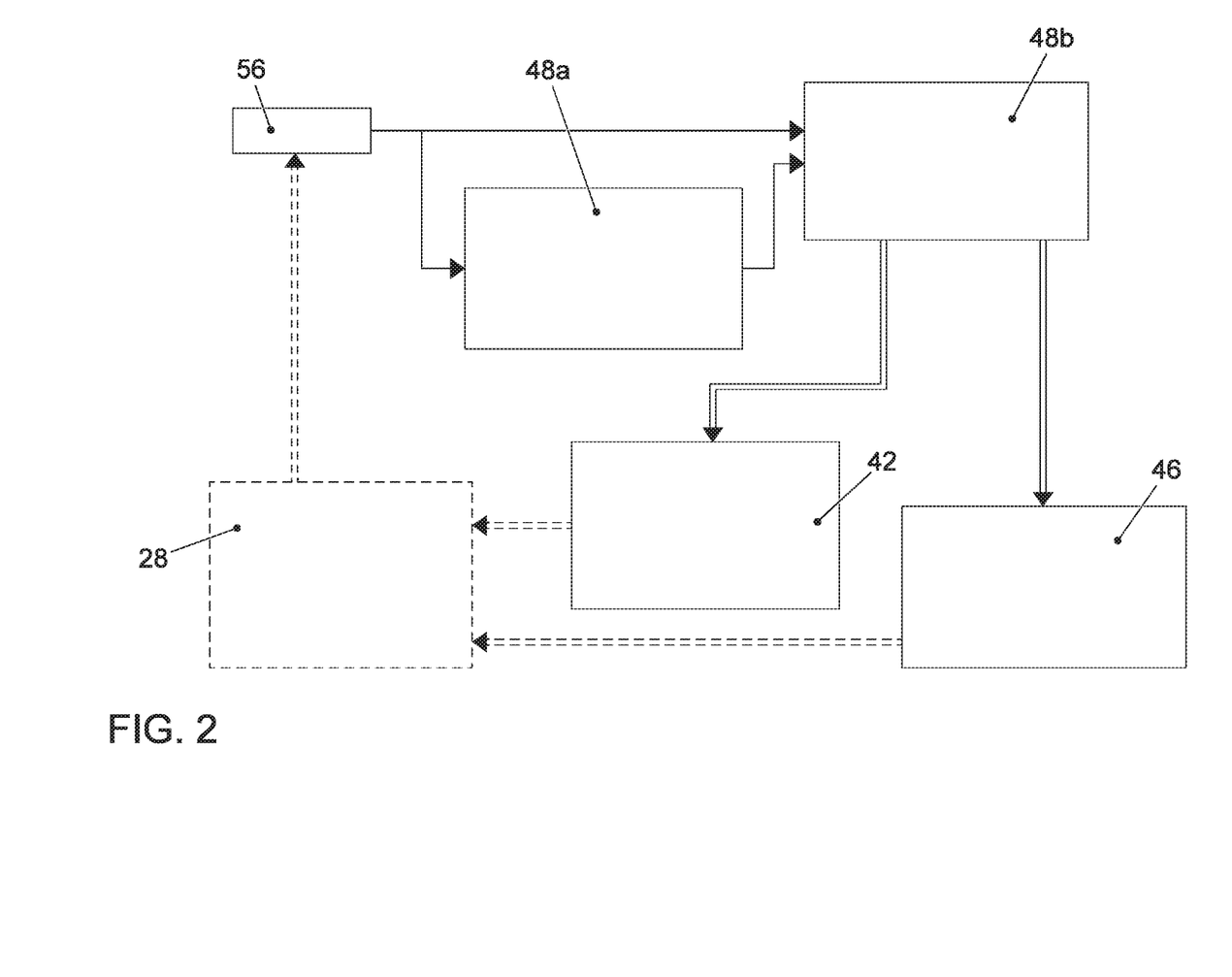
FIG. 2: shows a block diagram for illustrating the carrying out of a method according to the invention, based on the internal combustion engine according to FIG. 1.

FIG. 2 illustrates a block diagram of the functional relationships in carrying out a method according to the invention for venting the fuel tank system of the internal combustion engine according to FIG. 1.

It is illustrated in FIG. 2 that exhaust gas that forms during combustion of the fuel-fresh gas mixture quantities in the combustion chambers 28 of the combustion engine 20, which flow around the lambda sensor 56 that is integrated into the exhaust tract 26 and that subsequently generates a measuring signal that represents the fraction of residual oxygen in the exhaust gas. This measuring signal is transmitted to the control device 48, which in its function as a lambda controller 48a and in its function as a regulation device 48b uses this measuring signal for tank venting and for controlling the purge gas conveying device 46, the tank vent valve 42, and the shutoff valve 54. It may be provided that the control device 48 in its function as a regulation device 48b for tank venting uses the absolute value of the measuring signal of the lambda sensor 56 as well as a correction value that has been determined by the control device 48 in its function as a lambda controller 48a, in order to control the injectors and the throttle valve 36 anew or in a modified form, based on the measuring signal of the lambda sensor 56, in order to maintain a defined fuel-oxygen ratio of the fuel-fresh gas mixture quantities that are combusted in the combustion chambers 28. Based on these input variables, the control device 48 in its function as a regulation device 48b for tank venting computes control signals for the purge gas conveying device 46 and the tank vent valve 42. By appropriate actuation of the purge gas conveying device 46 and a corresponding adjustment of the tank vent valve 42, the quantity of purge gas introduced into the fresh gas tract 18 is influenced, which in turn affects the fuel that is introduced into the combustion chambers 28 overall, i.e., via the injectors on the one hand and via the fresh gas on the other hand. The controls of the purge gas conveying device 46 and of the tank vent valve 42 may be carried out decoupled from one another, in particular via separate control loops, or in each case taking the control value of the other component into account.

Figure 3:
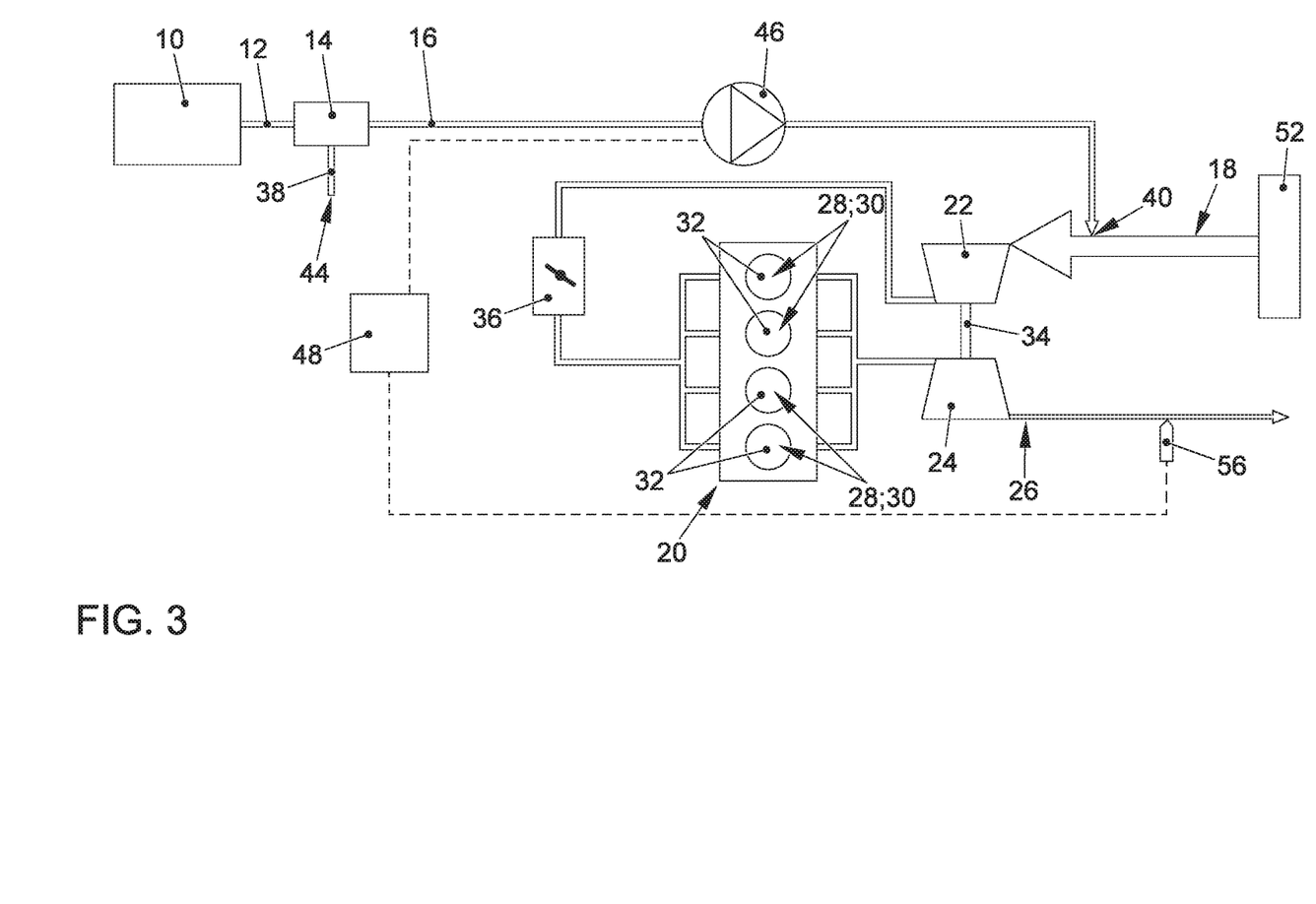
FIG. 3: shows a schematic illustration of an internal combustion engine according to the invention according to a second embodiment.

The internal combustion engine illustrated in FIG. 3 corresponds to that according to FIG. 1, with the exception that neither a tank vent valve 42, a pressure and temperature sensor 50, nor a shutoff valve 54 is provided. In addition to the pressure ratio of the ambient surroundings to the fresh gas tract 18, in the internal combustion engine according to FIG. 3 the volume flow of the purge gas in the purge gas line 16 during a tank venting operation may thus be actively influenced solely by an appropriate control of the purge gas conveying device 46 (see FIG. 4).

Figure 5:
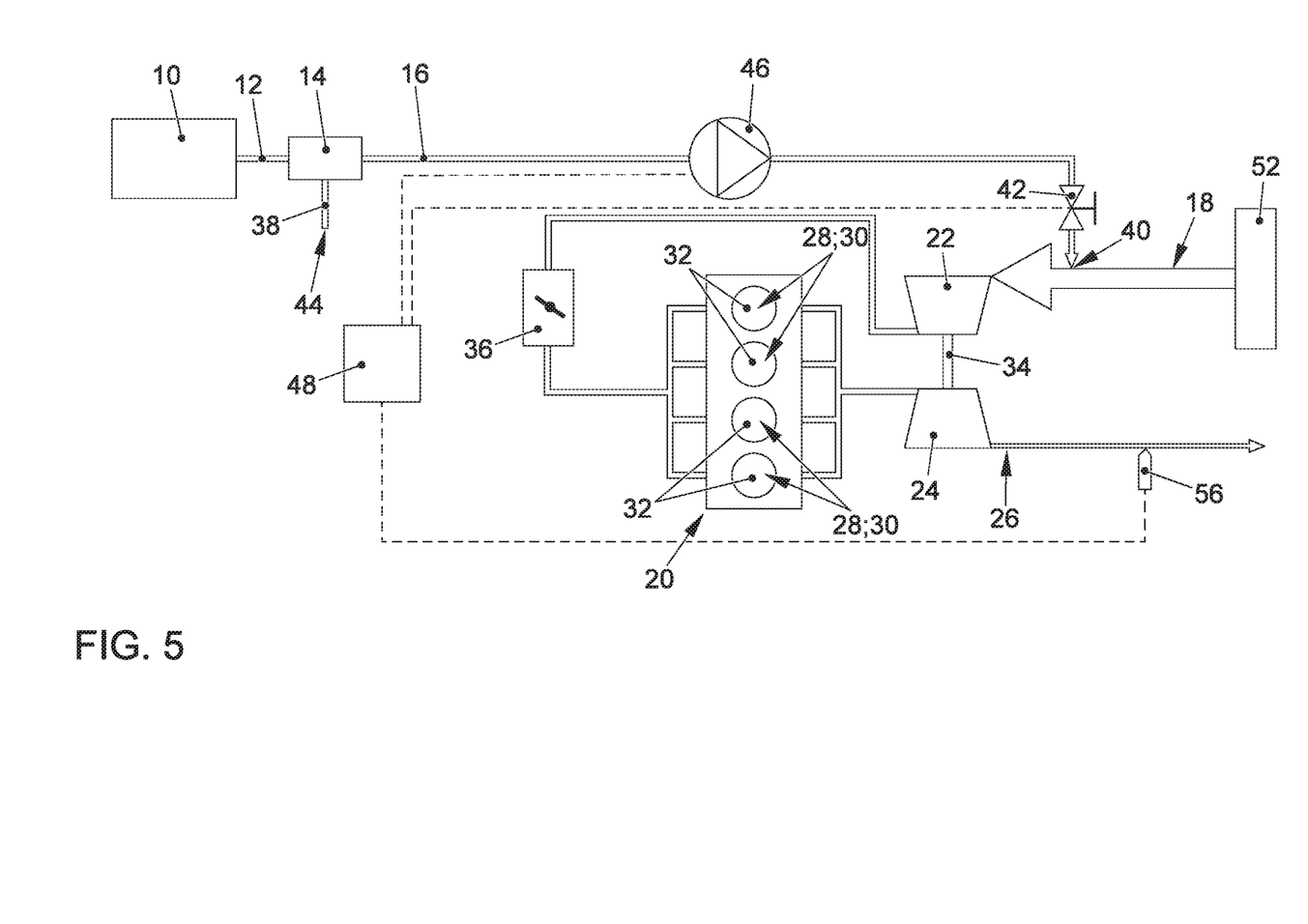
FIG. 5: shows a schematic illustration of an internal combustion engine according to the invention according to a third embodiment.

In contrast, in the internal combustion engine according to FIG. 5, in addition to the purge gas conveying device 46 only a tank vent valve 42 is integrated into the purge gas line 16. Thus, unlike the internal combustion engine according to FIG. 1, no pressure and temperature sensor 50, and also no shutoff valve 54, are provided. The functional relationships in carrying out a method according to the invention based on such an internal combustion engine according to FIG. 5 may correspond to those in FIG. 2.

Figure 6:
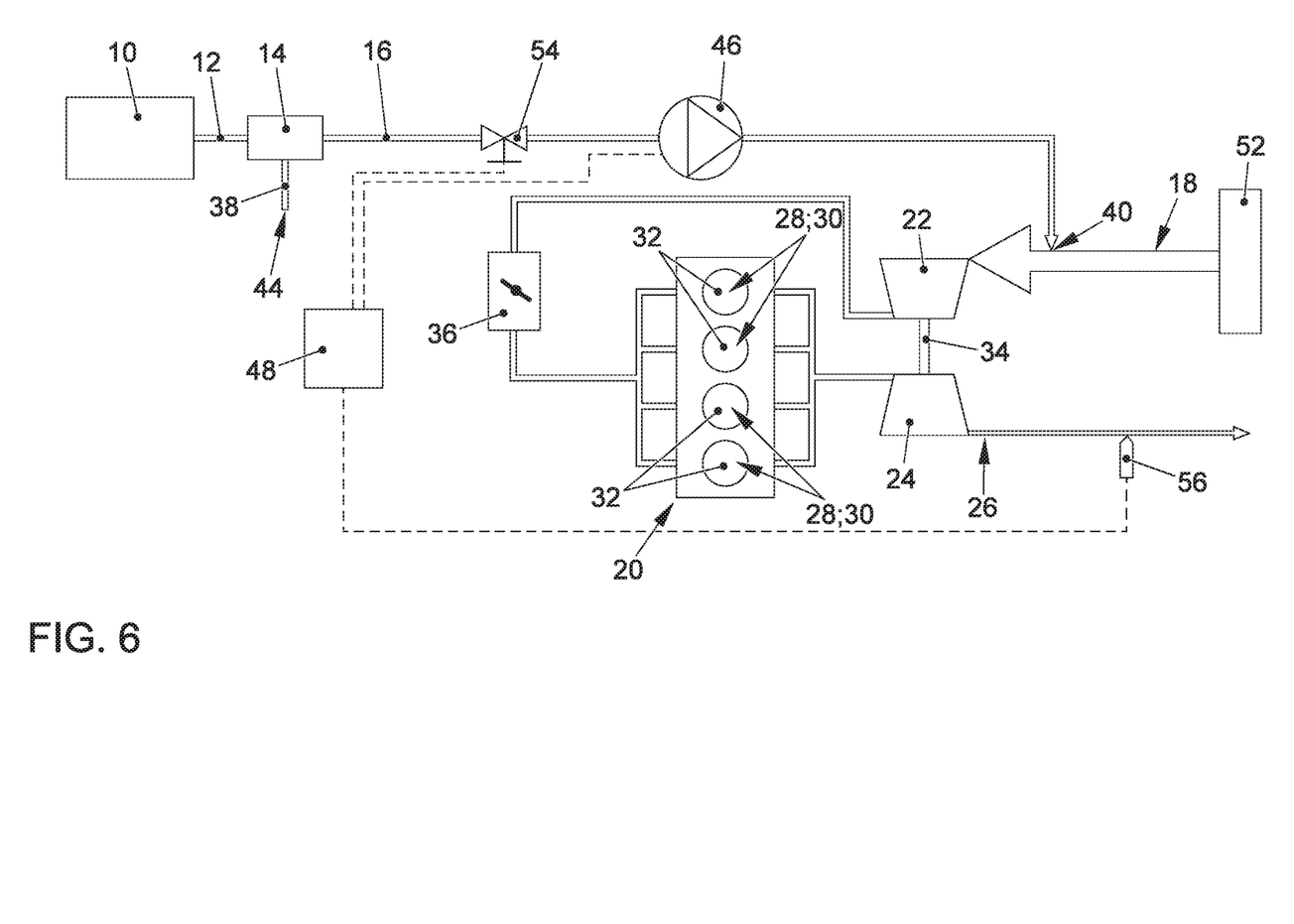
FIG. 6: shows a schematic illustration of an internal combustion engine according to the invention according to a fourth embodiment.

In the internal combustion engine according to FIG. 6, in addition to the purge gas conveying device 46 only a shutoff valve 54 is integrated into the purge gas line 16. An additional tank vent valve 42 as well as a pressure and temperature sensor 50, as additionally provided in the internal combustion engine according to FIG. 1, are not provided in this exemplary embodiment.

Figure 7:
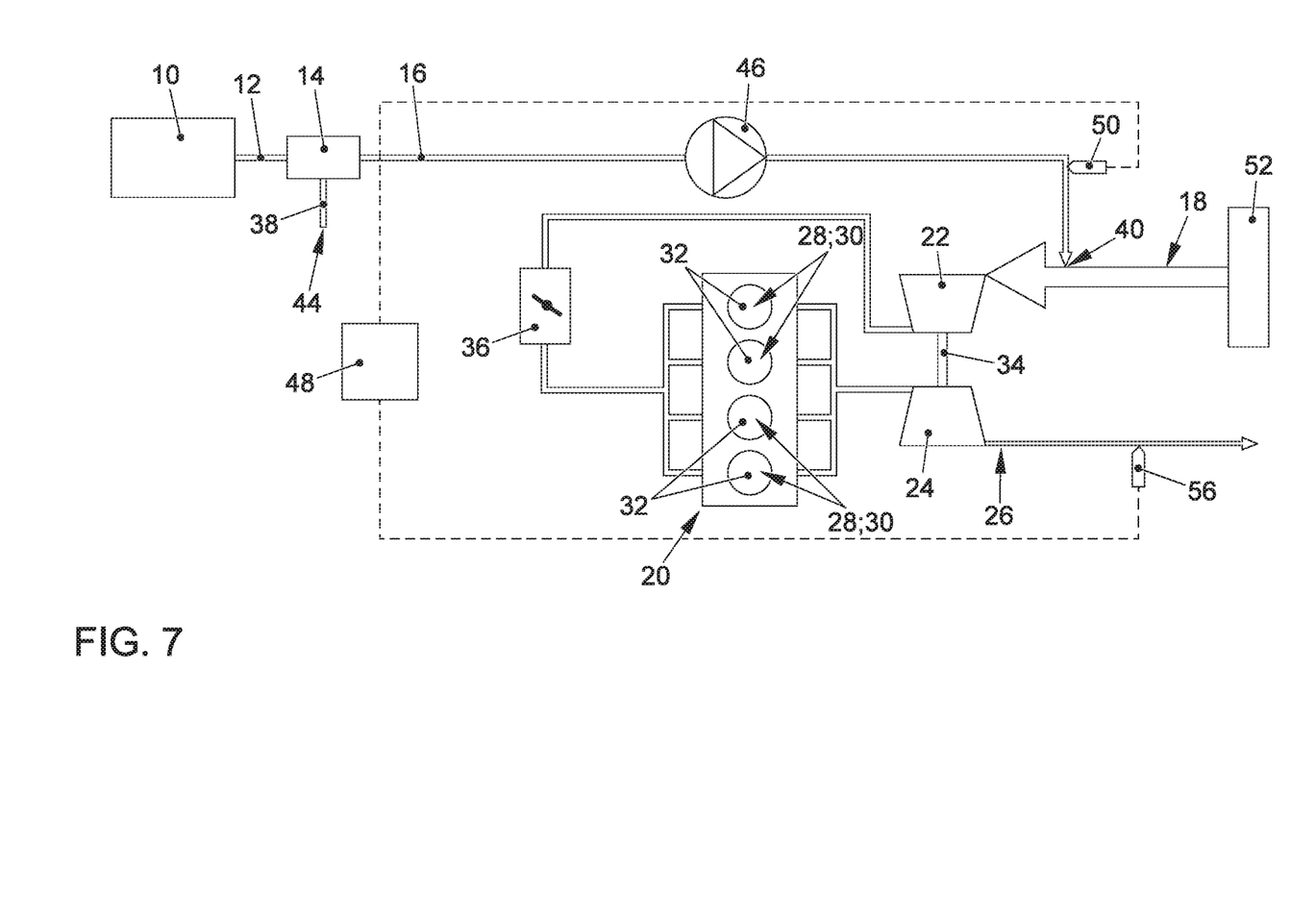
FIG. 7: shows a schematic illustration of an internal combustion engine according to the invention according to a fifth embodiment.

In contrast, in the internal combustion engine according to FIG. 7, in addition to the purge gas conveying device 46 only a pressure and temperature sensor 50 is integrated into the purge gas line 16.

Figure 4:
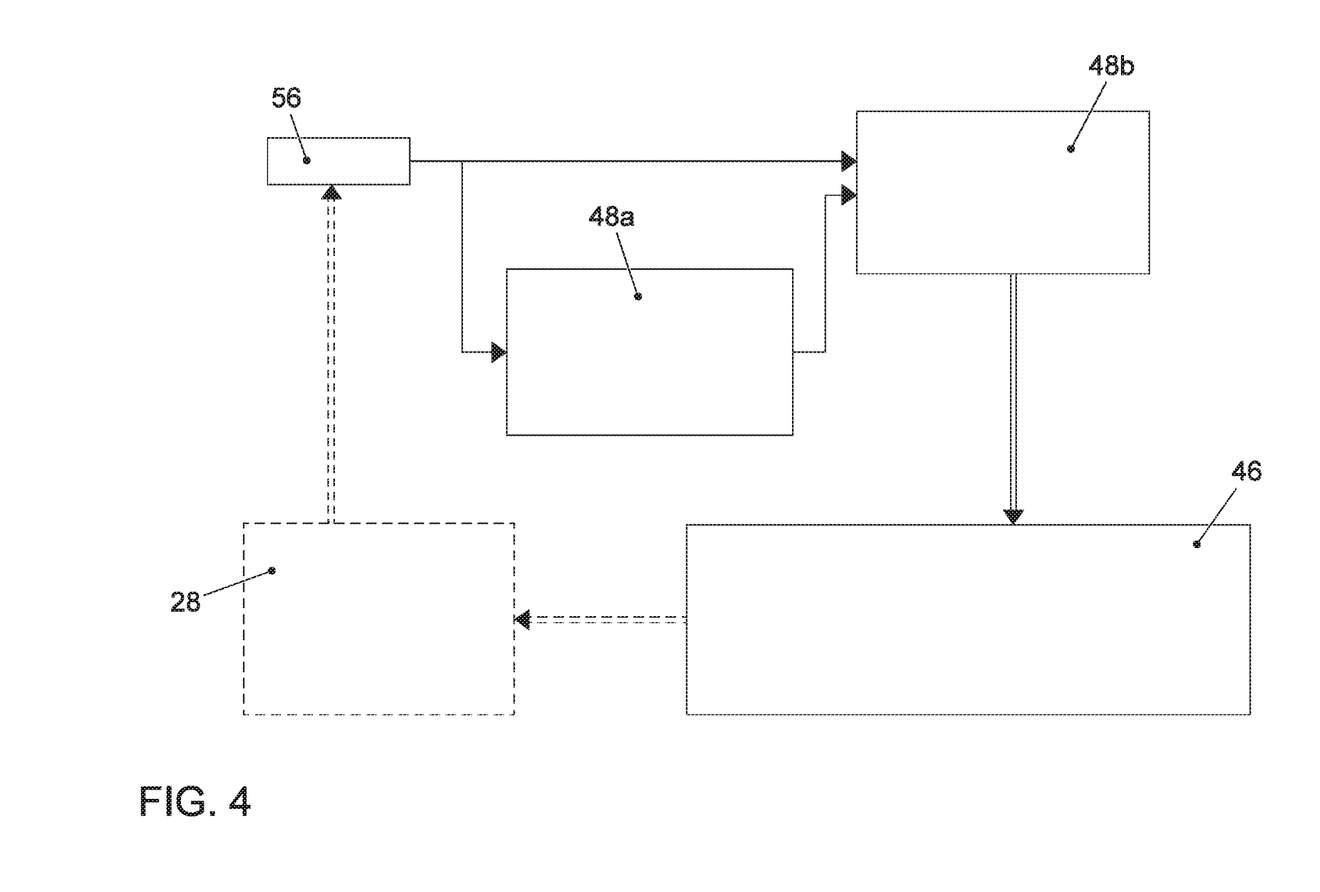
FIG. 4: shows a block diagram for illustrating the carrying out of a method according to the invention, based on the internal combustion engine according to FIG. 3.

The functional relationships in carrying out a method according to the invention based on an internal combustion engine according to FIGS. 6 and 7 may correspond to those in FIG. 4.

LIST OF REFERENCE NUMERALS 10 fuel tank
12 vent line
14 fuel vapor filter
16 purge gas line
18 fresh gas tract
20 combustion engine
22 charge air compressor
24 exhaust gas turbine
26 exhaust tract
28 combustion chamber of the combustion engine
30 cylinders of the combustion engine
32 pistons of the combustion engine
34 shaft
36 throttle valve
38 ambient air line
40 opening of the purge gas line
42 control valve/tank vent valve
44 opening to the environment
46 purge gas conveying device
78 control device
48a function of the control device as a lambda controller
48b function of the control device as a regulation device for tank venting
50 pressure sensor
52 air filter
54 shutoff valve
56 lambda sensor

The invention claimed is:

1. A method for venting a fuel tank system of an internal combustion engine that includes a fuel tank, a fuel vapor filter that is fluidically connected to an opening to the environment, a vent line that leads from the fuel tank to the fuel vapor filter, a purge gas line that leads from the fuel vapor filter to a fresh gas tract of the internal combustion engine, and a pump that is integrated into the purge gas line, and an exhaust tract with a lambda sensor integrated therein, the method comprising:

controlling the pump based on a measuring signal of the lambda sensor in order to regulate a volume flow of the purge gas in the purge gas line.

2. The method according to claim 1, wherein the fuel tank system further includes a control valve that is integrated into the purge gas line, the method further comprising controlling the control valve based on the measuring signal of the lambda sensor in order to regulate the volume flow of the purge gas in the purge gas line.

3. The method according to claim 2, wherein, for controlling the pump and/or the control valve, an absolute value of the measuring signal of the lambda sensor is utilized.

4. The method according to claim 2, wherein controls of the pump and of the control valve are carried out, for at least one of these components, taking the control value of the other component into account.

5. The method according to claim 4,
wherein the pump is operated in multiple drive speed stages, and the control valve may be controlled in a control range,
wherein a change is made from an operation of the pump in a first drive speed stage to an operation in a second drive speed stage when, during operation of the pump in the first drive speed stage, a greater purge gas requirement is determined despite maximum control of the control valve, and
wherein the first drive speed stage is lower than the second drive speed stage.

6. The method according to claim 2, wherein, for controlling the pump and/or the control valve, a correction value for a lambda controller of the internal combustion engine is used, wherein the correction value is derived from an absolute value of the measuring signal of the lambda sensor.

7. The method according to claim 2, wherein controls of the pump and of the control valve are carried out decoupled from one another.

8. An internal combustion engine comprising:
a combustion engine,
a fresh gas tract for supplying fresh gas to the combustion engine,
an exhaust tract, including a lambda sensor, for discharging exhaust gas from the combustion engine,
a fuel tank system that includes
a fuel tank,
a fuel vapor filter that is fluidically connected to an opening to the environment,
a vent line that leads from the fuel tank to the fuel vapor filter,
a purge gas line that leads from the fuel vapor filter to the fresh gas tract of the internal combustion engine, and
a pump that is integrated into the purge gas, and
a control device configured to automatically control the pump based on a measuring signal of the lambda sensor in order to regulate a volume flow of the purge gas in the purge gas line.

9. The internal combustion engine according to claim 8, further comprising a control valve that is integrated into the purge gas line.

10. The internal combustion engine according to claim 8, further comprising a pressure and/or temperature sensor that is integrated into the purge gas line.

11. The internal combustion engine according to claim 9, further comprising a shutoff valve that is integrated into the purge gas line, wherein the control device is configured to control the shutoff valve.

\* \* \* \* \*